United States Patent
Kumar et al.

(10) Patent No.: US 10,793,456 B2
(45) Date of Patent: Oct. 6, 2020

(54) EFFICIENT BIO-INORGANIC SYSTEM FOR TREATMENT OF SULPHIDIC WASTEWATER STREAMS CONTAINING OTHER CONTAMINANTS

(71) Applicant: Indian Oil Corporation Limited, Mumbai (IN)

(72) Inventors: Manoj Kumar, Faridabad (IN); Amardeep Singh, Faridabad (IN); Saket Ranjan, Begusarai (IN); Suresh Kumar Puri, Faridabad (IN); Sankara Sri Venkata Ramakumar, Faridabad (IN)

(73) Assignee: Indian Oil Corporation Limited, Mumbai (IN)

( * ) Notice: Subject to any disclaimer, the term of this patent is extended or adjusted under 35 U.S.C. 154(b) by 0 days.

(21) Appl. No.: 16/355,530

(22) Filed: Mar. 15, 2019

(65) Prior Publication Data
US 2019/0284071 A1 Sep. 19, 2019

(30) Foreign Application Priority Data
Mar. 15, 2018 (IN) .............................. 201821009529

(51) Int. Cl.
*C02F 3/34* (2006.01)
*C02F 1/68* (2006.01)
(Continued)

(52) U.S. Cl.
CPC .............. *C02F 3/341* (2013.01); *C02F 1/68* (2013.01); *C02F 3/085* (2013.01); *C02F 3/106* (2013.01);
(Continued)

(58) Field of Classification Search
CPC .......... C02F 3/341; C02F 3/347; C02F 3/107; C02F 3/106; C02F 3/085; C02F 3/06;
(Continued)

(56) References Cited

U.S. PATENT DOCUMENTS 4,911,843 A 3/1990 Hunniford et al.
5,603,832 A 2/1997 Hoyvik et al.
(Continued)

FOREIGN PATENT DOCUMENTS

EP 3169633 5/2017
IN 2480/MUM/2015 6/2015

OTHER PUBLICATIONS

Zhang, Chun-Ming, et al., "Catalytic removal of sulphide by an immobilized sulphide-oxidase bioreactor", Enzyme and Microbial Technology (2009) 44:96-100.
(Continued)

*Primary Examiner* — Nam X Nguyen
*Assistant Examiner* — Julia L. Wun
(74) *Attorney, Agent, or Firm* — Melissa M. Hayworth; E. Joseph Gess

(57) ABSTRACT

The present invention relates to a bio-assisted treatment of wastewater containing sulphide, phenols and hydrocarbons. Further, the present invention relates to a process for eliminating sulphide and other sulphur compounds including, but not limited to, mercaptans, disulfides, PAHs, phenols and hydrocarbons.

15 Claims, 4 Drawing Sheets

(51) Int. Cl.
*C02F 3/08* (2006.01)
*C02F 3/10* (2006.01)
*C02F 101/10* (2006.01)
*C02F 101/32* (2006.01)
*C02F 101/34* (2006.01)
*C02F 103/28* (2006.01)
*C02F 103/36* (2006.01)

(52) U.S. Cl.
CPC ............. *C02F 3/107* (2013.01); *C02F 3/345* (2013.01); *C02F 3/347* (2013.01); *C02F 2101/101* (2013.01); *C02F 2101/327* (2013.01); *C02F 2101/345* (2013.01); *C02F 2103/28* (2013.01); *C02F 2103/365* (2013.01); *C02F 2305/08* (2013.01)

(58) Field of Classification Search
CPC ................ C02F 3/345; C02F 2101/345; C02F 2101/327; C02F 2101/101; C02F 2103/365; C02F 2103/28; C02F 1/68; C02F 2305/08

USPC ........................................................ 210/617
See application file for complete search history.

(56) References Cited

U.S. PATENT DOCUMENTS

| | | | |
|---|---|---|---|
| 5,637,220 A | 6/1997 | Buisman | |
| 6,045,695 A | 4/2000 | Janssen et al. | |
| 6,306,302 B1* | 10/2001 | Maree | C02F 3/345 |
| | | | 210/605 |
| 7,731,851 B2* | 6/2010 | Tatarko | D21H 17/005 |
| | | | 210/605 |
| 2018/0133688 A1* | 5/2018 | Losic | B01D 15/00 |

OTHER PUBLICATIONS

Ravichandra, P., et al., "Biological sulfide oxidation using autotrophic *Thiobacillus* sp.: evaluation of different immobilization methods and bioreactors", Journal of Applied Microbiology (2009) 106:1280-1291.

* cited by examiner

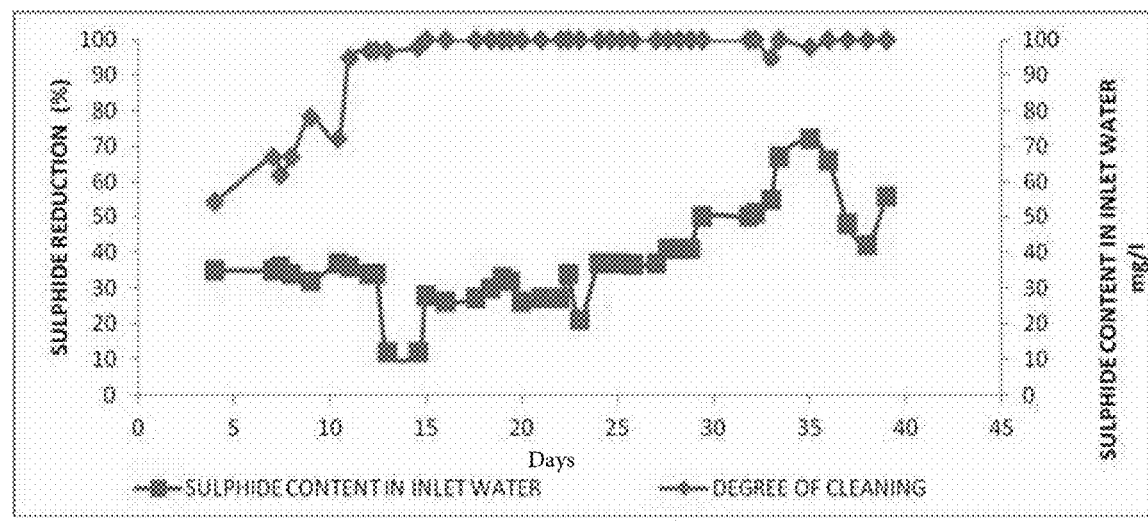
Figure 2: Continuous operations results in terms of sulphide reduction
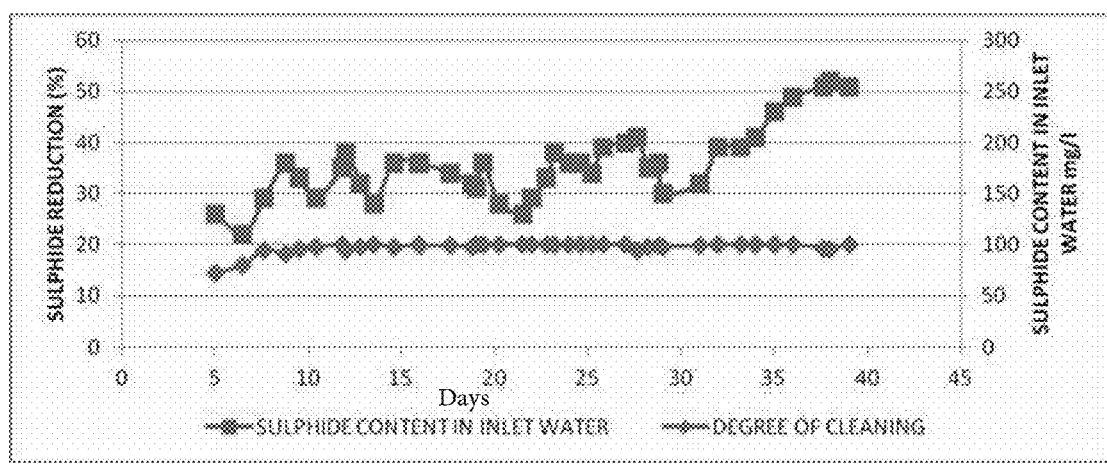
Figure 3: Continuous operations results in terms of sulphide reduction

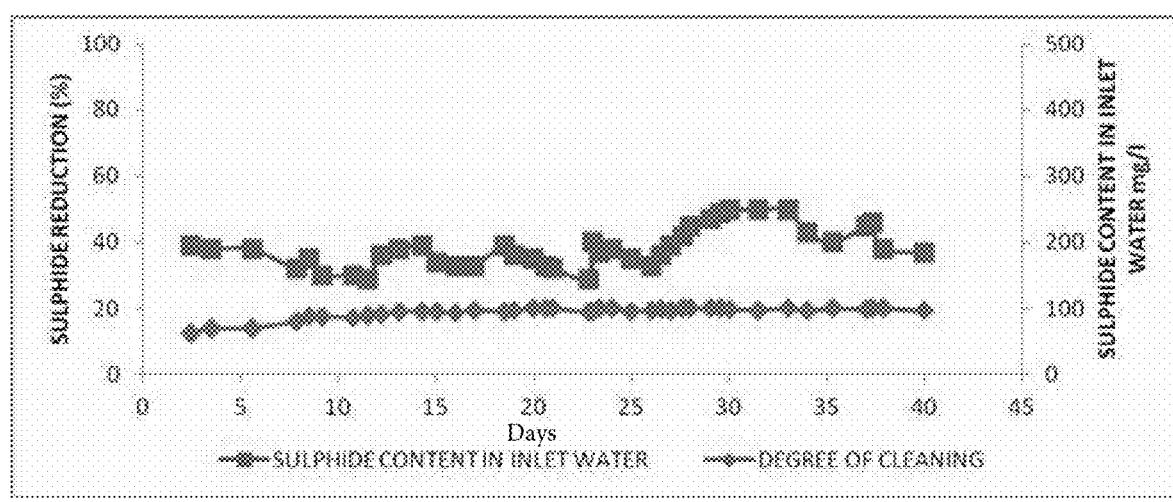
Figure 4: Continuous operations results in terms of sulphide reduction

EFFICIENT BIO-INORGANIC SYSTEM FOR TREATMENT OF SULPHIDIC WASTEWATER STREAMS CONTAINING OTHER CONTAMINANTS

This application claims priority to Indian Patent Application No. 201821009529 filed Mar. 15, 2018 entitled "Efficient Bio-Inorganic System For Treatment Of Sulphidic Wastewater Streams Containing Other Contaminants", the contents of which are hereby incorporated by reference in their entirety.

FIELD OF THE INVENTION

The present invention relates to bio-assisted treatment of wastewater containing sulphide, and other sulphur containing compounds. More particularly, the present invention relates to a process for bio-assisted treatment of wastewater containing sulphide and other sulphur containing compounds, and also bio-inorganic system for treatment of such wastewater.

BACKGROUND OF THE INVENTION

Sulphide often occurs in industrial wastewater, such as wastewater from oil refineries and petrochemical plants, wastewater from fossil fuel gasification plants, wastewater from paper and pulp mills, and waste water that undergoes anaerobic oxidation. Often other toxic components, such as volatile organic compounds, phenols, and polycyclic aromatic hydrocarbons are also found in these types of water. The sulphide and these toxic contaminants have to be removed from the wastewater due to their toxic nature, in-particular obnoxious odor of the sulphides. Essentially, this purification is required for further re-use of the wastewater.

A number of physicochemical methods are commonly used and known in order to remove sulfides from the wastewater streams. However, these chemical methods have high chemical and catalyst requirements, which in turn also lead to the requirement of highly expensive disposal methods. Therefore, microbiological methods have been developed as an alternative to chemicals methods. Several microorganisms have been studied for sulfide oxidation.

U.S. Pat. No. 5,637,220 entitled "Process for purifying sulphide-containing waste water" discloses a process for purifying waste water containing sulphide, where sulphide is oxidized to elemental sulphur in a reactor by sulphide-oxidizing bacteria in the presence of oxygen, and at least a part of the sulphur formed during the oxidation was separated from the waste water. The invention requires recycling of the sulphur to maintain at least 1 g/l of sulphur in the reactor.

EP 3169633 entitled "Method and plant for the treatment of sulphate containing waste water" discloses a process for treating sulphate containing effluent, which includes a) receiving a sulphide containing effluent into a two-phase fluidized bed reactor, which contains particles and floating media, b) permitting calcium carbonate from the effluent to precipitate on particles in the first fluidised bed reactor, c) aerating the solution in the reactor to remove $CO_2$ from the solution in order to increase the pH in the reactor, d) permitting biological sulphide oxidation to occur on the floating media by means of sulphide oxidizing bacteria to produce elemental sulphur, e) recycling the fluidized bed reactor at a sufficient rate to effect abrasion and remove elemental sulphur from the floating media, f) harvesting the sulphur from a top portion of the reactor and recycling hydroxyl ions internally in solution to enhance calcium carbonate precipitation by further increasing the pH. The patent describes a two phase process which requires a separate removal of carbonates to maintain the pH.

U.S. Pat. No. 5,603,832 relates to a method of removing hydrogen sulphides from oil containing water by adding nitrate in a dose ratio from 1:10 to 1:40 with respect to the sulphides.

U.S. Pat. No. 4,911,843 describes a process to remove dissolved hydrogen sulphide from waste system by adding nitrate ions directly into the pipeline. Due to addition of nitrate ions directly, there would not be any controlled formation of a biofilm. Further, the biofilm which may have formed by chance on the walls of the pipeline will not be very effective because of its relatively small surface.

Zhang et al. in paper entitled "Catalytic removal of sulphide by an immobilized sulphide-oxidase bioreactor" (*Enzyme Microb Technol* 44:96-100) proposed the use of a bioreactor packed with an enzyme (sulphide-oxidase) immobilized on chitosan beads, using oxygen as an electron acceptor. The paper describes removal up to 99% of inlet sulphide.

Ravichandra et al in paper entitled "*Biological sulfide oxidation using autotrophic Thiobacillus sp.: evaluation of different immobilization methods* and bioreactors (*Journal of Applied Microbiology* 106 (2009) 1280-1291), discloses various immobilization methods and bioreactors for sulfide oxidation using *Thiobacillus* sp. The paper describes maximum sulfide oxidation of 96% with alginate matrix.

U.S. Pat. No. 6,045,695 discloses a process for biological treatment of spent caustic solution containing sulfides, wherein the solution is introduced into an aerobic reactor containing sulfide oxidizing bacteria. The sulfides are partly converted to elemental sulfur and partly to sulfate by controlling the redox potential in the reactor at a value below 300 mV (against an Ag/AgCl reference electrode), or below −97 (against reference electrode). The process suffers from disadvantages, such as the sulfide oxidation is done by using M sulfidovorans which result into formation of thiosulfate. It is known that formation of the thiosulfate is undesirable in waste water.

Indian Patent Application No. 2480/MUM/2015 entitled "Bio-Assisted Process For Treatment And Regeneration Of Spent Caustic" discloses a bio-assisted method for treatment of spent caustic by treating with haloalkaliphilic consortium of bacteria capable of reducing or transforming sulphides, thiols, mercaptans and other sulphur containing compounds, phenols, hydrocarbons, naphthenic acids and their derivatives in spent caustic.

Based on the aforementioned citations, it is evident that there is a need for an improved method for eliminating sulphides simultaneously with other sulphur compounds, such as phenols, mercaptans, hydrocarbons, naphthenic acids, amines and their derivatives from wastewater. Therefore, the present invention provides a system with coexistence of bio-inorganic environments to remove 100% sulfides and mercaptans from wastewater.

SUMMARY OF THE INVENTION

The main objective of the present invention is to provide a bio-assisted process for treatment of wastewater containing sulphide, phenols and hydrocarbons, the process comprises the steps of:
  a) developing a bio-inorganic system on a carrier or filler material in a reactor column; wherein the system comprises an inorganic material selected from at least of nano-sized ZnO and ZnO+MWCNTs;

b) passing waste-water to be treated into the reactor to remove contaminants from the wastewater; wherein the reactor comprises a particulate bed attached with a microbial film;

c) introducing gas/air in the reactor to get dissolved oxygen (DO) in the range of 0.1 to 5 mg/l;

d) removing particulate solid product from the bottom of the reactor in a continuous manner; and e) obtaining purified water with reduced concentration of the contaminants.

Another objective of the present invention is to provide a bio-inorganic system for treatment of sulphur and sulphide containing wastewater, wherein the system comprises:

a carrier and/or filler material; a microbial film; and an inorganic material;

wherein the inorganic material is selected from at least one of nano-sized ZnO and ZnO+MWCNTs; and wherein the microbial film is developed on the carrier and/or filler material in a reactor column.

Yet another objective of the present invention is to provide a process for biological treatment of sulphur and sulphide containing wastewater, wherein the process comprises the steps of:

a) developing a bio-inorganic system in a reactor column;

b) passing wastewater to be treated into the reactor to remove contaminants from the wastewater;

c) introducing gas/air in the reactor to get dissolved oxygen (DO) in the range of 0.1 to 5 mg/l;

d) removing particulate solid product from the bottom of the reactor in a continuous manner; and e) obtaining purified water with reduced concentration of the contaminants; wherein the bio-inorganic system comprises:

a carrier and/or filler material; a microbial film; and an inorganic material;

wherein the inorganic material is selected from at least one of nano-sized ZnO and ZnO+MWCNTs; and wherein the microbial film is developed on the carrier and/or filler material in a reactor column.

BRIEF DESCRIPTION OF DRAWINGS

FIGS. 2, 3 and 4 illustrates continuous operations results in terms of sulphide reduction.

DESCRIPTION OF THE INVENTION

Figure 1A:
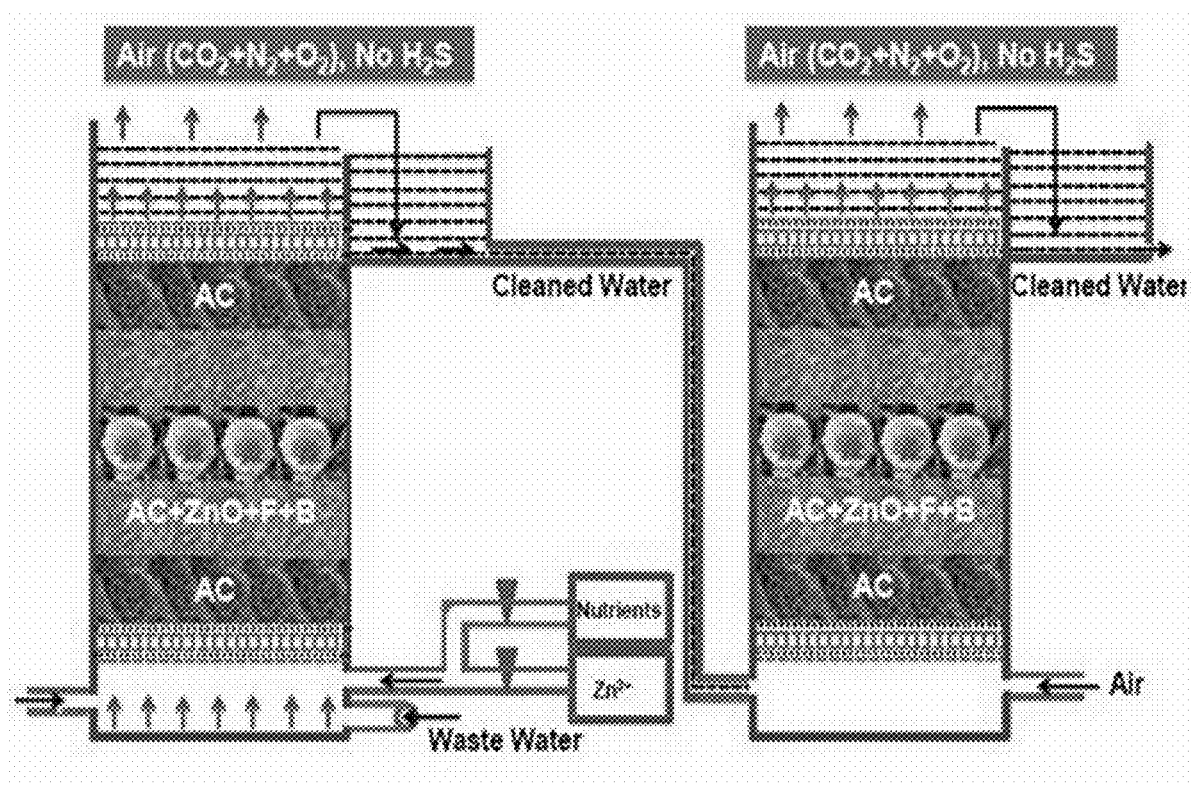
FIGS. 1A and 1B illustrates schematic diagram of a packed bed column.

While the invention is susceptible to various modifications and/or alternative processes and/or compositions, specific embodiment thereof has been shown by way of example in tables and will be described in detail below. It should be understood, however that it is not intended to limit the invention to the particular processes and/or compositions disclosed, but on the contrary, the invention is to cover all modifications, equivalents, and alternative falling within the spirit and the scope of the invention as defined by the appended claims.

The tables and protocols have been represented where appropriate by conventional representations, showing only those specific details that are pertinent to understanding the embodiments of the present invention so as not to obscure the disclosure with details that will be readily apparent to those of ordinary skill in the art having benefit of the description herein.

The following description is of exemplary embodiments only and is NOT intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

Definitions

For the purposes of this invention, the following terms will have the meaning as specified therein: As used herein, the terms "nano-sized" when used in the context of the present invention refers to the inorganic materials having particle size less than 500 nm.

As used herein, the term "Bio-inorganic", when used in the context of the present invention refers to coexistence of microbes with inorganic materials. The microbes are selected from the bacterium identified as *Thiobacillus* Sp and the fungus identified as *Aspergillus* sp. The term "biological catalysts" may be used interchangeably with "bio-inorganic system".

As used herein, the term "bacterium consorti", when used in the context of the present invention refers when used in the context of the present invention refers to consortium containing bacteria selected from *Thiobacillus Thiomicrospira, Suljblobus* and *Thermothrix* capable of treating or breaking down contaminants from wastewater or effluent.

As used herein, the term "Contaminants" as used in context of present invention refers to all the impurities present in the wastewater/effluent not limited to but including sulphides, thiols, mercaptans and other sulphur containing compounds, polycyclic aromatic hydrocarbons (PAHs), phenols, hydrocarbons, naphthenic acids and their derivatives.

As used herein, the term "effluent" as used in context of the present invention was from Indian Oil Corporation, Barauni Refinery, Begusarai-India. The present invention is NOT to be considered limited the effluent describe herein but to include all the effluents within the spirit and the scope of the invention. The term "effluent" may be interchangeably used with the term "wastewater".

As used herein, the terms "filler or carrier material" may be interchangeably used with the term "packing material".

As used herein, the term "ZnO" as used in context of the present invention refers to Zinc Oxide and the term "MWCNT" as used in the context of the present invention refers to Multiwalled Carbon Nanotubes.

The present invention provides a process for bio-assisted treatment of wastewater containing sulphide, phenols and hydrocarbons. Further, the present invention relates to a process for eliminating sulphide and other sulphur compounds including, but not limited to, mercaptans, disulfides, PAHs, phenols and hydrocarbons.

In accordance to a main embodiment, the present invention provides a process for biological treatment of sulphur and sulphide containing wastewater, wherein the process comprises the steps of:
- a) developing a bio-inorganic system on a carrier or filler material in a reactor column; wherein the system comprises an inorganic material selected from at least of nano-sized ZnO and ZnO+MWCNTs;
- b) passing waste-water to be treated into the reactor to remove contaminants from the wastewater; wherein the reactor comprises a particulate bed attached with a microbial film;
- c) introducing gas/air in the reactor to get dissolved oxygen (DO) in the range of 0.1 to 5 mg/l;
- d) removing particulate solid product from the bottom of the reactor in a continuous manner; and
- e) obtaining purified water with reduced concentration of the contaminants.

In accordance to a preferred embodiment, the present invention provides a bio-inorganic system for treatment of sulphur and sulphide containing wastewater, wherein the system comprises:
a carrier and/or filler material; a microbial film; and an inorganic material;
wherein the inorganic material is selected from at least one of nano-sized ZnO and ZnO+MWCNTs; and
wherein the microbial film is developed on the carrier and/or filler material in a reactor column.

In accordance to yet another embodiment, the present invention provides a process for biological treatment of sulphur and sulphide containing wastewater, wherein the process comprises the steps of:
- a) developing a bio-inorganic system in a reactor column;
- b) passing wastewater to be treated into the reactor to remove contaminants from the wastewater;
- c) introducing gas/air in the reactor to get dissolved oxygen (DO) in the range of 0.1 to 5 mg/l;
- d) removing particulate solid product from the bottom of the reactor in a continuous manner; and
- e) obtaining purified water with reduced concentration of the contaminants; wherein the bio-inorganic system comprises:
a carrier and/or filler material; a microbial film; and an inorganic material;
wherein the inorganic material is selected from at least one of nano-sized ZnO and ZnO+MWCNTs; and
wherein the microbial film is developed on the carrier and/or filler material in a reactor column.

In accordance to an embodiment of the present invention, the reactor comprises an active biofilm of a fungus and bacterium consortia. The bacterium is selected from the group of colourless sulphur bacteria, including *Thiobacilius, Thiomicrospira, Sulfolobus* and *Thermothrix*. These microbes have ability to form biofilm on solid surface In accordance to another embodiment of the present invention, the bacterium was identified as *Thiobacillus* Sp while the fungus was identified as *Aspergillus* sp.

In accordance to an aspect of the present invention, the reactor is filled with the carrier/filler material providing large contact area which is covered by the active biofilm.

In accordance to another aspect of the present invention, the microbial film attached to the particulate bed develops on the carrier/filler due to ability of the microbial film to form biofilm and/or hypha formation.

In accordance to a preferred embodiment of the present invention, the bacteria and fungi species were combined to construct a highly efficient degradation microbial system in a reactor column.

In accordance to another embodiment of the present invention, the pure cultures of one fungi and one bacteria are used to degrade the pollutants.

In accordance to another preferred embodiment of the present invention, at least one of the ZnO and/or ZnO with MWCNTs was mixed with the degradation microbial system.

In accordance to yet another embodiment of the present invention, the ZnO and/or ZnO with MWCNTs are being employed to remove last few traces of sulphides.

In accordance to a feature of the present invention, the amount of ZnO and/or ZnO with MWCNTs is 0.5-10% of the total volume of packing material and microbial biomass in microbial degradation system.

In accordance to another feature of the present invention, the ZnO and/or ZnO with MWCNTs are nano-sized inorganic materials.

In accordance to an embodiment of the present invention, the nano-sized ZnO are synthesized in situ by fungi on its surface once ZnO is introduced in the system.

In accordance to another embodiment of the present invention, the nano-sized ZnO or ZnO with MWCNTs are added during the growth of fungi carrier/filler. The performance of these robust and thermotolerant strains formed is not affected when they are operated under unsteady states i.e. under higher concentration of the contaminants in the wastewater.

In accordance to an embodiment, the present invention provides a process that enables continuous input of reactants and continuous discharge of liquid products while retaining biological catalysts for continuous reuse.

In accordance to another embodiment of the present invention, the process that enables very efficient continuous discharge of solid products of the purification reaction while retaining active biological catalysts for continuous reuse.

In accordance to another embodiment of the present invention, the process enables mixing liquid reactants and biological catalysts so as to create conditions for the effective conduct of the reaction.

In accordance to a feature of the present invention, the effluent i.e. the wastewater and oxygen may be in co-current or counter current manner. In the co-current mode both the air supply and the effluent inputs were at the bottom of reactor.

In accordance to yet another feature of the present invention, the particulate solid product is removed from the bottom of the reaction vessel i.e. the reactor in a continuous manner.

In accordance to an aspect of the present invention, the filler or carrier material is selected from, but is not limited to, activated granular carbon, biochar, clay chips, polyurethane foam, LDPE, Raschig rings, biochar treated with microbes, biological ceramsite, etc.

In accordance to another aspect of the present invention, the reactor column comprises at least one inlet and/or nozzles for influx of waste water, at least one outlet and/or nozzle for removal of the purified water, at least one inlet and/or nozzle for input of gas/air, and a particulate bed attached to the microbial film.

In accordance to yet another aspect of the present invention, the reactor column may be selected from a packed fixed bed column, a fluidized bed column, and/or reverse fluidized bed column type subsequent to proper sizing of packing material.

In accordance to another feature of the present invention, retention time in the reactor to remove >99% of the sulphide is in the range of 10-60 minutes, which also helps in reducing the volume of the reactor considerably.

In accordance to a preferred feature of the present invention, the pH in the reactor should preferably not be higher than 9.5 in the process. Preferably, the pH in the reactor is maintained within the range of 7.5 to 9.0. Therefore, the process is used for purifying wastewater or other water flows containing sulphide, or other sulphur compounds capable of being oxidized to elemental sulphur or sulphate such as mercaptans, thiophenols, dialkyl sulphides, disulphides, polysulphides, carbon disulphide and the like.

In accordance to another preferred feature of the present invention, the *Aspergillus* sp. can transform in situ the ZnO to Nanosized ZnO and these nanosized ZnO can be used in performing the present invention.

Advantages of the Present Invention

In accordance to an embodiment, the present invention discloses a bio-assisted method for treating wastewater streams containing sulphide and other contaminants, wherein a bio-inorganic system based on packed bed column consisting of nano sized zinc oxide fungi and bacteria is used for the treatment of sulphidic stream containing sulphides in the range of 0.1-500 ppm and other contaminant in the range of 1 ppm to 1000 ppm. Further, the system can tolerate higher hydraulic or organic loads because of higher biomass concentration in the reactor.

In accordance to another embodiment, the present invention can treat wastewater containing sulphides and other contaminants simultaneously like phenols, mercaptans, hydrocarbons, naphthenic acids, amines and their derivatives. The coexistence of bio-inorganic environments, in accordance to the present invention, removes 100% sulfides and mercaptans. Further, the present invention is suitable for high TDS/inorganic ion loaded effluent system and removes total dissolved solids (TDS) >50%.

In accordance to yet another embodiment, the present invention can treat wastewater having temperature more than 60° C.

In accordance to an aspect, the present invention reduces Chemical Oxidation Demand (COD) of the wastewater by more than 95% with hydraulic retention time (HRT) in the range of 10 min-120 min.

In accordance to another aspect of the present invention, both conversion of sulphides to elemental sulfur and sulphate is possibly changing the oxygen concentration and configuration of the reactor.

In accordance to yet another aspect, the present invention enables easy retention of biomass and no requirement of recirculation, which in turn allows higher biomass concentration. Further, the present invention employs pure cultures of both bacteria and fungi, which are easy to reproduce.

EXAMPLES

The present invention is exemplified by following non-limiting examples:

The present invention provides a method for eliminating sulphide, mercaptans, disulfides, thiols, PAHs, phenols, and hydrocarbons. The method is based on an active biofilm of a fungus and bacterium consortia along with nano-sized ZnO or ZnO+MWCNTs in a packed bed column. In the fungi bacteria synergistic relationship, the degradation performance of bacteria could be further improved as fungi could improve adsorption quantity of pollutant due to direct contact between fungal mycelia and pollutants. Moreover, the fungus is more resistant to acid and dry conditions than bacteria, which was a helpful property when the said treatment processes produced acid compounds. The nano sized ZnO are synthesized in situ by fungi on its surface.

Example 1

Isolation of Desired Microbes

This type of the microbes can be isolated from soil or water which has earlier exposure with sulphidic water viz. refinery ETP, effluent from anaerobic digestion plant, drill cuttings, produced water etc.

The soil/water sample from refinery ETP post biotrickling filter collected using standard microbiological practices and following two selective media were used for isolation of microbes with desired traits:

IOCIBT media-1 (in g/l): 5 g of $Na_2HPO_4$, 5 g of $KH_2PO_4$, 0.4 g of $MgSO_4$, 0.1 g of $(NH_4)_2SO_4$, 0.03 g of $CaCl_2$, 0.01 g of $FeCl_3$, 0.02 g of $MnSO_4$ and 2 g of $Na_2S$, crude oil 1%, and the final pH was adjusted to 8.0.

IOCIBT media-2 (in g/l): 10 g of glucose, 5 g of peptone, 0.5 g of $MgSO_4.7H_2O$, 1.0 g of $KH_2PO_4$, and 2 g of $Na_2S$ distilled water, crude oil 1%, final pH 8.0.

The culture plates were incubated at 37-degree C. for 5 days and fast growing microbes was isolated and inoculated in the following media:

IOCIBT media-1B (in g/l): 5 g of $Na_2HPO_4$, 5 g of $KH_2PO_4$, 0.4 g of $MgSO_4$, 0.1 g of $(NH_4)_2SO_4$, 0.03 g of $CaCl_2$, 0.01 g of $FeCl_3$, 0.02 g of $MnSO_4$ and 2 g of $Na_2S$, and the final pH was adjusted to 8.0.

IOCIBT media-2B (in g/l): 10 g of glucose, 5 g of peptone, 0.5 g of $MgSO_4.7H_2O$, 1.0 g of $KH_2PO_4$, and 2 g of $Na_2S$ distilled water, final pH 8.0.

The culture plates were incubated at 37-degree C. for 5 days and fast growing microbes was isolated This isolation on these selective media results in isolation of selective microbes with ability to decontaminate the sulphidic water with other contaminants.

The isolated bacteria were identified according to "Bergey's Manual of Determinative Bacteriology" through the observation of the bacteria and the morphology of the bacteria clone and a series of physiological and biochemical tests as well as through 16 S rDNA gene.

The fast growing bacteria isolated from media IOCIBT media-1 was having following characteristics:

Gram Negative, aerobic. Thermotolerance 80° C., pH tolerance 6.0-9.0.

Colony of the strain was roundness, wetness and hyaline. The colony's center was thicker than rim. Strain form a layer of mucosa in the liquid medium. This organism is able to grow on a wide range of sulfur compounds, including sulfur, sulfide, thiosulfate, trithionate, tetrathionate, hexathionate, heptathionate, dithionate, sulfite, thiocyanate. Sulfur is deposited in colonies on thiosulfate agar under microerophilic conditions but not in aerobic liquid cultures.

The fast growing fungi isolated from media IOCIBT media-2 was having following characteristics:

Colony Characteristics:

Colony diameter after 4 days' incubation on CTA at 25° C. was 10 mm Growth was restrictedly umbonate.

Conidia were sparse, olivaceous buff to grey olivaceous; mycelium was white and floccose; exudate absent; soluble pigment light chestnut in colour; reverse bay Colonies on MEA were 13-15 mm in diameter, centrally umbonate, with floccose white mycelium; conidia were moderate, lemon yellow to grey olivaceous in colour; exudate and soluble pigment were absent. Reverse was chestnut.

Colonies on CY20S were 9-10 mm in diameter, umbonate; mycelium was floccose; conidia were sparse to moderate, olivaceous buff in colour; exudate and soluble pigment were absent; reverse pale, light vinaceous buff; margin was low, regular or irregular.

Colonies on CZ were 10-13 mm in diameter, consisting of a dense basal mycelial felt submerged and nonsporulating in marginal area, 2 to 3 mm wide, umbonate, with floccose white mycelium; conidia were sparse, olivaceous buff; exudate and soluble pigment absent; reverse was clay pink at margin while purplish date at center.

Microscopic Characteristics: Stipes were 60-150×2.5-4.0 μm, smooth to slightly rough-walled, uncoloured to pale green or slightly brownish; conidial heads were columnar to radiate, 18-30 μm. Vesicles pyriform to spathulate, 6.0-14.0 μm wide, hyaline to pale green. Aspergilli were biseriate. Metulae were covering only the upper half of the vesicle, 6.0×2.5 μm in size; phialides were 5.0×2.0 μm in size, ampuliform with tapering collula. Conidia were 2.5-3.5 μm in diameter, globose to sub-globose, with wall smooth to slightly rough. Hulle cells were very abundant, globose to sub-globose, 15.0×20.0 μm in size, hyaline to light green en masse.

The bacterium was identified as *Thiobacillus* Sp while the fungus was identified as *Aspergillus* sp.

The microbes thus are isolated and identified and can be used for developing a bio-inorganic system on a carrier or filler material in a reactor column and decontaminating the sulphidic water.

Example 2

Fabrication of the Reactor

A laboratory scale fixed bed reactor was constructed to investigate the performance of sulphide and other contaminant removal by inoculating bacteria and fungi mixed species. The indicative schematic diagram of the packed bed column which can be used in present invention is illustrated in FIG. 1 A.

Figure 1B:
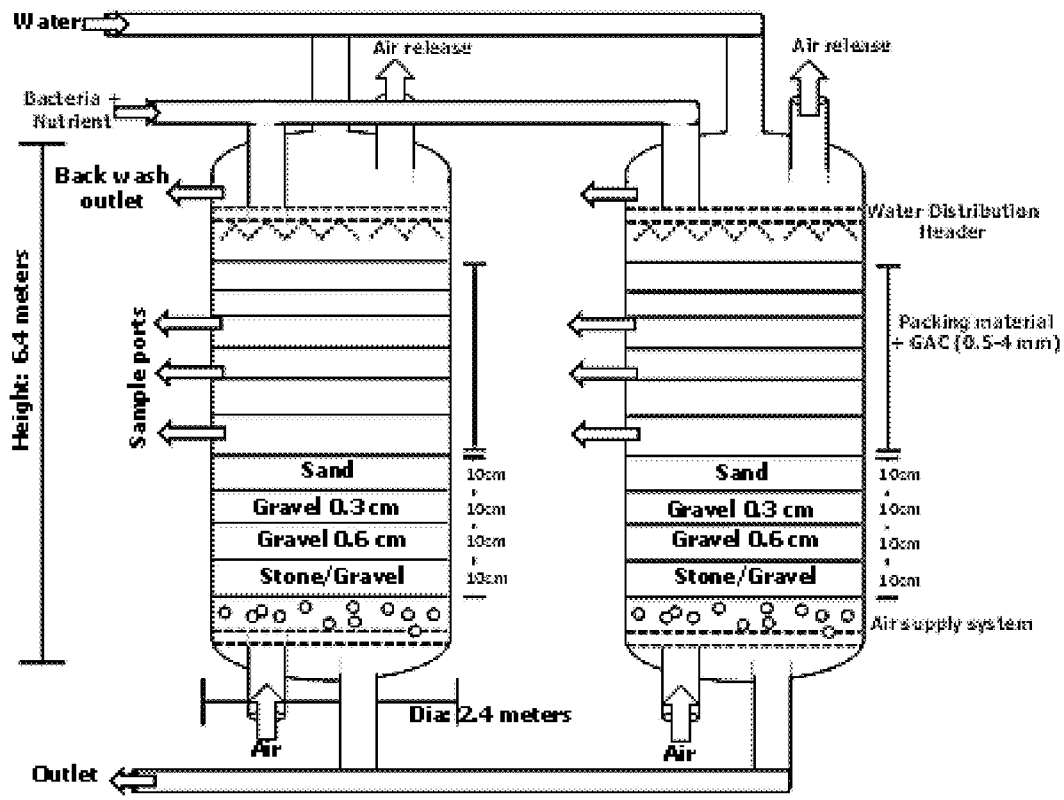

The packed bed column is cylindrical in shale with height to diameter ration 1:0:1 to 2 to 0.5. FIG. 1B is one another non-limiting example of column in which two such reactors with possible parallel operation are shown.

The reactor can be operated at room temperature (10-50° C.).

Example 3

Preparation of Bio-Inorganic System

In order to grow fungus and bacteria along with Nano sized ZnO or Zn+MWCNT, in the reactor following method was adopted before using the reactor for wastewater treatment:

The *Agpergillus* sp and *Thiobacillus* sp. were used for experiment. First activated granular carbon and 0.25% nano-sized ZnO or 0.25% of Zn+MWCNT (2:1) mixed properly and filled with water up to the top of column to dip all the activated granular carbon (ACS). Followed by addition of yeast extract (0.145% of the ACS) and then the bacterial cells were added. Subsequently fungal strain was added. The fungal strain and bacteria strain's log phase cells in the rate 1% (w/w) was dosed in the reactor along with ACS. This reactor was aerated to have dissolved oxygen >2 ppm for 2 days. After two days the formed bio-inorganic system in the reactor is ready for further use.

Example 4

Treatment of Wastewater Stream

When the whole column showed the growth of microbes, the treatment of wastewater stream was studied. The reactor was fed with wastewater containing 500 ppm of sulphide, 50 ppm phenol, 20 ppm mercaptans and 50 ppm of oil and grease. During the experiment the Dissolved oxygen of water is adjusted to 2.5 within the reactor and flow of wastewater adjusted to have HRT of 1 hr. During experimentation the system was compared in following combination using:

Column having only virgin activated charcoal
Column having charcoal and fungi
Column having charcoal and bacteria
Colum having charcoal and nano-sized ZnO
Column having charcoal, Fungi and nano-sized ZnO
Column having charcoal, bacteria and nano-sized ZnO
Column having charcoal, Bacteria, Fungi and nano-sized ZnO
Column having charcoal, Bacteria, Fungi, ZnO+MWCNTs The result of the experiment shown in Table 1

TABLE 1

| Parameter | % degradation in | | |
| --- | --- | --- | --- |
| | Sulphide concentration | Phenol concentration | O&G content |
| Column having only virgin activated characoal | 12 | 24 | 12 |
| Column having charcoal and fungi | 15 | 18 | 35 |
| Column having charcoal and bacteria | 24 | 45 | 65 |
| Colum having charcoal and nano-sized ZnO | 34 | 12 | 12 |
| Column having charcoal, Fungi and nano-sized ZnO | 45 | 53 | 34 |
| Column having charcoal, bacteria and nano-sized ZnO | 39 | 39 | 64 |

TABLE 1-continued

| Parameter | % degradation in | | |
|---|---|---|---|
| | Sulphide concentration | Phenol concentration | O&G content |
| Column having characoal, Bacteria, Fungi and nano-sized ZnO | 100 | 100 | 99.4 |
| Column having characoal, Bacteria, Fungi, ZnO + MWCNTs | 100 | 100 | 99 |
| Column having characoal, Bacteria, Fungi, ZnO (nano sized by in situ transformation by fungi) | 100 | 100 | 99.2 |

Therefore, we can conclude that the decline of sulphide concentration was due to synergistic activity microorganism biodegradation and reaction with ZnO and/or CNT.

Example 5

The feed was taken having the sulphide content of 350 ppm with other contaminants like thiosulphates, phenols, PAH, O&G was used for treatment in the column having Column having charcoal, Bacteria, Fungi and ZnO. Rest all conditions are kept as of example 4.

The characteristics of wastewater (feed) and outlet water after treatment (treated water) are as follows in Table 2:

TABLE 2

| Parameter | Feed | Treated water |
|---|---|---|
| Sulphides (mg/L) | 350 | 0 |
| Thiosulphates (mg/L) | 120 | 0 |
| Phenol (mg/L) | 50 | 0.28 |
| PAH (mg/L) | 12 | 0.1 |
| O&G (mg/L) | 55 | 2 |
| TDS (mg/L) | 1256 | 574 |
| COD (mg/l) | 267 | 23 |

Example 6

The feed was taken having the sulphide content of 350 ppm with other contaminants like thiosulphates, phenols, PAH, O&G was used for treatment in the column having Column having charcoal, Bacteria, Fungi and ZnO+MWCNTs. Rest all conditions are kept as of example 4. The characteristics of inlet (feed) and outlet water after treatment (treated water) are as follows in Table 3:

TABLE 3

| Parameter | Feed | Treated water |
|---|---|---|
| Sulphides (mg/L) | 350 | 0 |
| Thiosulphates (mg/L) | 120 | 0 |
| Phenol (mg/L) | 50 | 0.20 |
| PAH (mg/L) | 12 | 0.11 |
| O&G (mg/L) | 55 | 1 |
| TDS (mg/L) | 1256 | 552 |
| COD (mg/l) | 267 | 21 |

Example 7

The feed was taken having different sulphide content of 350 ppm with column having activated granular carbon, Bacteria, Fungi, and nanosized ZnO and reactor was run in continuous mode. Rest all conditions are kept as of example 4. The continuous operations result in terms of sulphide reduction are given in FIGS. 2, 3 and 4.

FIG. 2 illustrates the continuous operations of sulphide reduction for inlet water with sulphur content in the range of 0-100 mg/l. FIG. 3 illustrates the continuous operations of sulphide reduction for inlet water with sulphur content in the range of 0-300 mg/l. FIG. 4 illustrates the continuous operations of sulphide reduction for inlet water with sulphur content in the range of 0-500 mg/l.

The result showed the process is equally effective at different concentration of sulphides present in wastewater.

Example 8

In Situ Generation of Nano Sized ZnO

First activated granular carbon and 0.3% of ZnO mixed properly and filled with water up to the top of column to dip all the activated granular carbon (ACS). Followed by addition of yeast extract (0.145% of the ACS) and then log phase cells of fungal strain in the rate 1% (w/w) were added. This was incubated for 4 days with aeration (10 L/min). This resulted formation of nano sized ZnO on the surface of carbon and fungi. Subsequently bacteria strain was dosed in the reactor along with ACS. This reactor was aerated to have dissolved oxygen >2 ppm for 2 days. After two days the formed bio-inorganic system in the reactor is ready for further use.

Example 9

In accordance of the present invention in situ biological regeneration of ZnO takes place. The process can run in continuous mode for 200-260 days without regeneration and subsequently it may require regeneration for fresh biomass as well ZnO. The regeneration necessitates conversion of ZnS to ZnO can be done by two methods.

(i) Oxidative method: Thermodynamically the reaction is expected to be temperature dependent and requires comparatively high temperature and severe conditions. Regeneration experiments were conducted using a temperature of 550° C. for 5 h and indicate that $SO_2$ begins to release from ZnS in the presence of air. The $SO_2$ produced during regeneration can be treated by conversion to elemental sulfur which can be used in the production of sulfuric acid, or converted to a disposable sodium or calcium sulfate. It is interesting to note that particle of ZnO become smaller and smaller than starting ZnO at this temperature but there is chance to the formation of $ZnSO_4$ during heating method. Zinc sulfate being a compound with a larger molar volume than either ZnO or ZnS, tends to block the pores in the sorbent thus leading to low sorbent utilization at breakthrough. Thermodynamic analysis predicts that $ZnSO_4$ is a stable phase when regeneration is carried out at low temperatures or at high oxygen concentrations, but there has been no direct evidence to support this prediction.

(ii) Chemical method: Chemically, ZnO can be regenerated by two ways (a) using 2M HCl and converting it into $ZnCl_2$ and $H_2S$. However, $ZnCl_2$ is not stable and getting moisture immediately and not possible to process for regeneration at last step and will also make the system more corrosive comparative to other process. (b) Using 2M $HNO_3$ and converting it into $Zn(NO_3)_2$, SO and NO which is more easier to control the process. In this process, 1st chemical reaction will be done using $HNO_3$ and $2^{nd}$ thermal heating will be allowed at low temperature condition using 250° C. This process helps to control direct generation of H2S and obtained elemental sulfur only. Subsequent to regeneration of the ZnO, the microbes can be inoculated as described below.

What is claimed is:

1. A process for biological treatment of wastewater containing sulphur compounds, wherein the process comprises the following steps:
    a) developing a bio-inorganic system consisting of an inorganic material selected from at least one of nano-sized ZnO and ZnO+MWCNTs on a carrier and filler material in a reactor column;
    b) passing the wastewater to be treated into the reactor column comprising a particulate bed attached with an active microbial film to remove contaminants from the wastewater;
    c) introducing oxygen-containing gas in the reactor column to get dissolved oxygen (DO) in the range of 0.1 to 5 mg/l;
    d) removing particulate solid product from the bottom of the reactor column in a continuous manner; and
    e) obtaining purified water with reduced concentration of the contaminants.

2. A bio-inorganic system for treatment of wastewater containing sulphur compounds, wherein the system consists of:
    a carrier and filler material; a microbial film; and
    an inorganic material selected from at least one of nano-sized ZnO and ZnO+MWCNTs on the carrier and filler material; and
    wherein the microbial film is present on the carrier and filler material in a reactor column.

3. A process for biological treatment of wastewater containing sulphur compounds, wherein the process comprises the following steps:
    a) developing a bio-inorganic system in a reactor column;
    b) passing the wastewater to be treated into the reactor column to remove contaminants from the wastewater;
    c) introducing oxygen-containing gas in the reactor column to get dissolved oxygen (DO) in the range of 0.1 to 5 mg/l;
    d) removing particulate solid product from the bottom of the reactor column in a continuous manner; and
    e) obtaining purified water with reduced concentration of the contaminants;
    wherein the bio-inorganic system comprises:
        a carrier and filler material;
        a microbial film; and
        an inorganic material on the carrier and filler material;
    wherein the inorganic material is selected from at least one of nano-sized ZnO and ZnO+MWCNTs; and
    wherein the microbial film is developed on the carrier and filler material in the reactor column.

4. The process as claimed in claim 1, wherein the reactor column is selected from at least one of a fixed bed reactor column, fluidized bed reactor column, reverse fluidized bed reactor column, and packed bed reactor column.

5. The process as claimed in claim 1, wherein the reactor column comprises at least one inlet and/or nozzles for influx of the wastewater, at least one outlet and/or nozzle for removal of the purified water, and at least one inlet and/or nozzle for input of oxygen-containing gas.

6. The process as claimed in claim 1, wherein the inorganic material is synthesized in situ in the reactor column on a surface of the microbial film.

7. The process as claimed in claim 1, wherein the inorganic material is added during the growth of the microbial film on the carrier and filler material.

8. The process as claimed in claim 1, wherein the microbial film is a bioactive film of at least one of fungus and bacterium consortia.

9. The process as claimed in claim 8, wherein the bacterium consortia is selected from at least one of *Thiobacillus, Thiomicrospira, Sulfolobus*, and *Thermothrix*.

10. The process as claimed in claim 8, wherein the fungus is *Aspergillus* sp.

11. The process as claimed in claim 1, wherein the carrier and filler material is selected from at least one of activated granular carbon, biochar, clay chips, polyurethane foam, low density polyethylene (LDPE), Raschig rings, biochar treated with microbes, and biological ceramsite.

12. The process as claimed in claim 1, wherein the reactor column is operated at a pH maintained in the range of 7.5 to 9.0.

13. The process as claimed in claim 1, wherein the reactor column is operated at a room temperature in the range of 20-30° C.

14. The process as claimed in claim 1, wherein the contaminants include sulphides, thiols, hydrocarbons and their derivatives.

15. The process as claimed in claim 1, wherein the contaminants include mercaptans, polycyclic aromatic hydrocarbons, phenols, naphthenic acids and their derivatives.

* * * * *